May 13, 1969     W. S. WILSON     3,444,353
WELDING TIPS
Filed Feb. 5, 1965
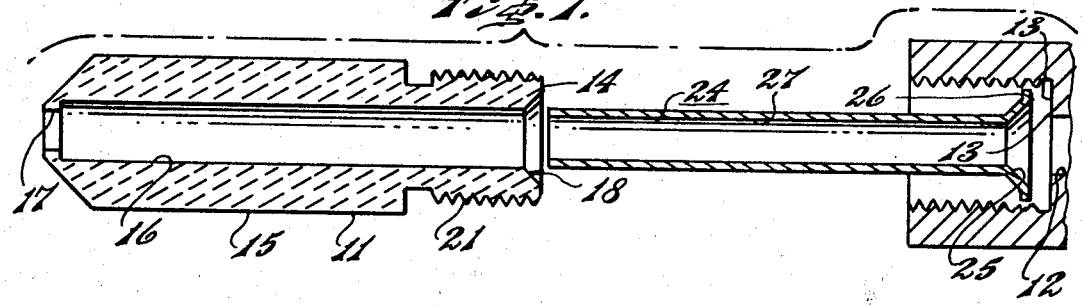
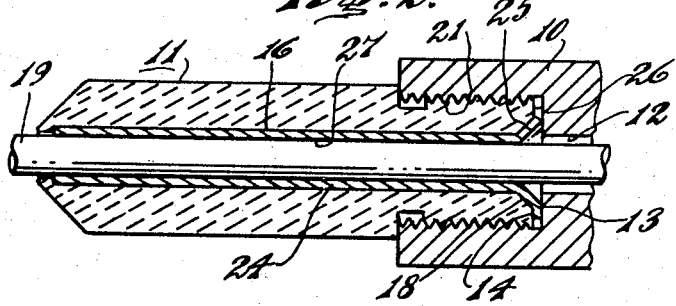
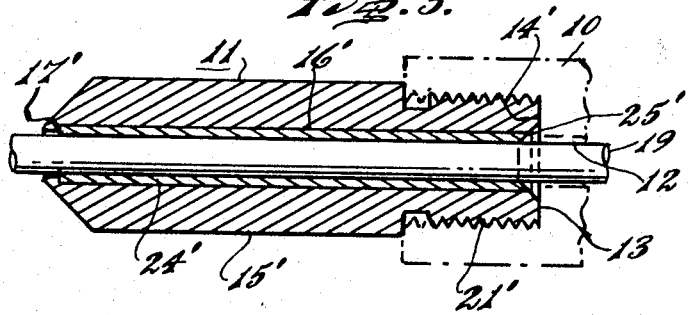
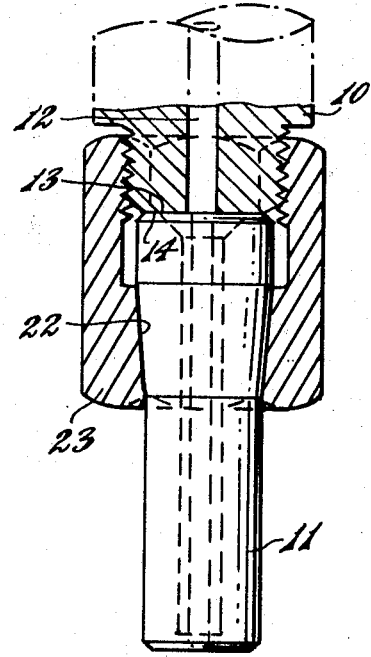
INVENTOR
William S. Wilson
BY Frank H. Borden
ATTORNEY

United States Patent Office 3,444,353
Patented May 13, 1969

3,444,353
WELDING TIPS
William S. Wilson, % Allied Metal Products Co.,
3349 N. P St., Philadelphia, Pa. 19134
Filed Feb. 5, 1965, Ser. No. 430,585
Int. Cl. B23k 35/04, 9/26, 35/22
U.S. Cl. 219—136                             5 Claims

ABSTRACT OF THE DISCLOSURE

A replaceable tip assembly, for a welding tool, comprises an elongated hollow shell (in certain embodiments non-conductive) with an abutment face at its inboard end, an inner metallic tube with an inboard end shoulder cooperating with said face and having an inside surface of a diameter to fit and conduct a current to a coaxial welding rod, and means adjacent the inboard end of the shell for fastening to a permanent part of the tool (and in certain embodiments there is a tapered and/or flared end surface on one or more of the parts, facilitating assembly and use of the tool).

---

This invention relates to welding tips for automatic welding machines of the submerged arc type (granule flux).

As these machines have been provided in the past, a conducting holder is provided with a replaceable conducting welding tip. Usually both the holder and the welding tip are made of copper or copper alloy metal. The holder and the tip are provided with registering axial bores through which the welding wire passes axially beyond the tip toward the work. As the wire is supplied from a roll, it has an inherent curl and tendency to curl. As the welding wire is formed of steel, it has a highly abrasive reaction with the soft metal of the holder and tip as it passes therethrough. This is laterally accentuated by the curl of the wire. This is most evident toward the ends and especially the exit end of the welding tip, although wear takes place all along its length. This not only affects the accurate guiding of the wire by the tip but also it reduces the conductivity between the tip and the wire as the bore in the tip enlarges. This necessitates frequent replacements of the soft welding tip.

Mention should be made of another disadvantageous feature of the present machines. This lies in the fact that in adjustments preparatory to welding, the holder and the associated welding tip are adjusted vertically relative to the work and therein in some cases the welding tip with its high conductivity contacts the work and results in a highly disadvantageous shorting "burn-out" of the tip, requiring at least replacement.

This invention relates to replaceable welding tips including hardened inserts for automatic welding machines. These machines are generally designated for submerged arc welding.

In machines of this type, a vertically adjustable copper or copper alloy holder is provided mounting a replaceable hollow welding tip, of the same high conductivity as the holder. Generally in the adjustment of the apparatus the holder and attached welding hollow tip as noted is adjusted axially relative to the work. In many cases contact of the welding tip against the work, in the absence of a welding rod, effects a shorting "burn-out," which is extremely undesirable. The hollow welding tip forms a guide and contact-making element for an axially fed steel wire rod passing into the tip from an axial bore in the holder as it is consumed in the welding operation, and this requires high conductivity between the tip and the steel wire.

Although the "burn-out" is a serious difficulty, more importantly the passage of the steel or like wire through the soft welding tip has an eroding frictional effect enlarging the bore of the welding tip and diminishing its guiding accuracy and decreasing the conductivity between the tip and the electrode wire. This necessitates frequent replacements of the soft welding tips.

It is among the objects of this invention to preclude "burn-out" by providing a welding tip which is generally non-conductive; to provide a welding tip with a hardened tubular full length insert which is much more resistant to wear and erosion than the copper or copper alloy of the prior art particularly at its widely spaced ends; to provide a replaceable hardened flared tubular insert for welding tips in which the flare establishes the current conveyance for the entire insert so that the tip itself can be non-conducting and thus immune to "burn-out"; to provide a replaceable welding tip which is cheaper than conventional soft metal welding tips; to provide in combination as an article of manufacture a welding tip and a hardened tubular insert for replacement of welding tips of conventional welding machines; to provide a replaceable hardened tubular flared insert for welding tips in which the flare forms a guiding member to guide the end of a welding rod emerging from the bore of a holder, despite enlarging wear of the latter; and many other objects and advantages will become more apparent as the description proceeds.

In the accompanying drawings, forming part of this description:

FIGURE 1 represents an exploded section of the assembly of welding tip, removable hardened insert and a fragment of its holder.

FIGURE 2 represents a section of these same parts in coupled association, with an axially slidable wire therein in fragmentary form.

FIGURE 3 represents a section, partially in phantom, of a modified replaceable unit threaded into a holder.

FIGURE 4 represents a section, partially in phantom, of a modified external shape of tip coupled to a holder by a tapering sleeve coupling.

The invention is concerned with what are known as welding machines, each of which has a vertically adjustable holder 10, to which is removably connected a welding tip 11. Customarily both the holder 10 and the tip 11 are of copper or a copper alloy for high conductivity, and the holder has an axial bore 12 initially registering with a cylindrical bore in the welding tip 11, (not shown). The modes of attaching the welding tip to the holder 10 are not of importance, although mention may be made of mere screwing of the welding tip into the holder, as in FIGURES 1, 2 and 3, or the formation of a threaded tapering sleeve engaging a complementally tapered welding tip as shown in FIGURE 4. In any case the copper holder has a downwardly presenting flat face 13, generally normal to the bore 12, and the complemental welding tip has an upwardly presenting flat face 14, normal to the bore of the welding tip which faces are moved into axial abutment by movement on threads.

As previously organized the holder is adjustable vertically and the welding rod or wire 19, such as of steel or the like, passes downward through the bore 12 and the aligned bore in the welding tip, to contact with the work (not shown). The steel wire is continuously fed as it is consumed in the welding operation. The continuous feed of the steel wire, with its relative abrasive action erodes the bore and widens same in both the holder and the welding tip. This, as noted, not only diminishes the guiding action on the wire, but also introduces high contact resistance by spacing the interior of the bore in the tip from the sliding wire. This decrease in conductivity between the welding tip and the welding rod becomes serious, and replacements of the tip to establish proper conduction are frequent and expensive occurrences.

In carrying out the invention in an illustrative form a welding tip replacement shell 15 is provided having an axial bore 16 of uniform diameter, from a lower internal shallow shoulder 17 (if used with this form of the invention and this is not essential) to an upper annular sloping or conical internal surface 18, merging angularly into the upper flat face 14. The external configuration of the shell 15 is such as to be mountable in an associated holder 10, as by a threaded portion 21 having the face 14, as in FIGURES 1 and 2, or by having an external tapered surface 22, the upper end of which mounts the face 14, and which is threadably mounted on the shoulder by a tapered threaded sleeve 23 as in FIGURE 4. It is a feature of importance that the shell 15 in this form of the invention is formed of non-conductive material, such for purely illustrative instance as anodized aluminum, or a ceramic or like dielectric.

A cylindrical hardened tube 24 is provided, of the same length as the axial bore 15 of the shell, having a cylindrical bore 27 merging in the upper end in a conical outward flare 25, complemental to the conical surface 18 of the shell, and the outer end of the flare merges externally into an annular flat shoulder 26.

The flared tube 24 is pushed or dropped axially into the shell from the upper end until the conical surface or flare 25 seats upon the internal flared surface 18, and the flat shoulder 26 overlies the end surface 14. At the same time the inner end of the tube 24 engages the shallow internal shoulder 17, if this be provided. It will be seen that as the tube 24 is fully supported axially by its upper taper and shoulder, the shoulder 17 may be omitted in this form of the invention. The bore 27 of the tube is such as to slidably receive and conductively engage the welding wire 19, and the internal surface of the flare guides the approaching welding wire into the bore 27.

An important feature of the tube 24 is that it is hardened, while being an excellent conductor. Illustratively the tube is formed of beryllium copper hardened to 40 Rockwell. Any other material of similar or related characteristics may be used. Further, the clamping of the flat flange or shoulder 26 against the holder surface 13 conveys current from the holder throughout the tube, thus enabling the shell 15 to be formed of dielectric material, with all of the advantages thus entailed.

The assembled shell and replaceable tube is secured to the instant holder, as by the screw threads and anchored tightly. At this juncture the flat shoulder 26 is compressed against the conducting face 13 of the holder, by the face 14 of the shell.

While it will be clear that in the form of invention as so far described, the shell may be a non-conductor, and the inserted replaceable hardened tube may be merely supported by the flare and flange and merely dropped into the shell, so that the tube or the shell or both may be the subject of replacement and a unitary organization of shell and tube may be used if desired, as disclosed in FIGURE 3. In this case, a will be described, the unitary replaceable welding tip comprises a pressed or extended hardened tubular insert forced permanently into a shell of conducting material.

Referring to FIGURE 3, the shell 15' has a bore 16', which is a through bore from a shallow shoulder 17' to the end surface 14'. The shell in this case is made of conducting material, such as of copper or copper alloy, and has threads or the like, 21' by which the shell can be attached to the holder 10. The hardened tube insert 24' is a straight tube of uniform diameter throughout, which is forced slidably into the shell until the tube end engages and is stopped by the shallow internal shoulder 17'. This establishes a permanent unitary organization of shell and tube. At this point the entrance end is generally flush with the flat surface 14' of the shell. Preferably after the tube is anchored in the shell, the upper end is counter sunk as indicated in FIGURE 3. This is for the purpose of forming a guiding tapered surface 25'. In anchored association with the holder 10 the tube 24 has its bore in general alignment with the bore 12 in the holder. With delayed wear the unitary organization is replaced, in place of the replacement of the hardened tube alone of the earlier form of the invention.

The advantages of the invention will be clear, as will the fact that many changes and modifications may be made in the invention without departing from the spirit and scope thereof as recited in the appended claims.

I claim as my invention:

1. For a submerged-arc welding tool or the like, a replaceable tip assembly comprising an elongated external shell having an internal tubular bore and adjacent its inboard end an abutment face, an inner metallic electrical contact tube housed in and fitting said bore and having adjacent its inboard end a shoulder for cooperating with said abutment face to secure said tube in place, said tube having an elongated internal cylindrical surface of a diameter to fit and conduct a current to a welding rod coaxial with said assembly, and means adjacent the inboard end of said shell for fastening engagement with a securing means on a normally permanent part of the tool.

2. The assembly of claim 1, wherein an inner end portion of the tubular bore of said shell is tapered to facilitate reception of said inner metallic tube.

3. The assembly of claim 1, wherein an inner end portion of said metallic tube is flared.

4. The assembly of claim 1, wherein the said means for fastening engagement of the shell with said securing means is disposed on the external periphery of the shell.

5. The assembly of claim 1, wherein said shell is substantially a non-conductor of electricity.

References Cited

UNITED STATES PATENTS

| | | | |
|---|---|---|---|
| 1,475,189 | 11/1923 | Krebs | 219—136 X |
| 1,959,180 | 5/1934 | Stephens | 219—136 |
| 2,289,938 | 7/1942 | Smith | 219—136 |
| 2,428,849 | 10/1947 | Kratz et al. | 219—136 |
| 2,799,769 | 7/1957 | Vogel | 219—75 |
| 3,217,133 | 11/1965 | Mattmuller | 219—74 X |

RICHARD M. WOOD, *Primary Examiner.*

J. G. SMITH, *Assistant Examiner.*